(12) United States Patent
Konno et al.

(10) Patent No.: US 8,888,628 B2
(45) Date of Patent: Nov. 18, 2014

(54) TRANSMISSION GUIDE

(75) Inventors: Masahiko Konno, Osaka (JP); Kaori Mori, Osaka (JP); Yuji Kurematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 52 days.

(21) Appl. No.: 13/558,994

(22) Filed: Jul. 26, 2012

(65) Prior Publication Data
US 2013/0035184 A1 Feb. 7, 2013

(30) Foreign Application Priority Data

Aug. 2, 2011 (JP) ................................. 2011-169480

(51) Int. Cl.
*F16H 7/08* (2006.01)
*F16H 7/18* (2006.01)

(52) U.S. Cl.
USPC ......................................... 474/140; 474/111

(58) Field of Classification Search
USPC .................................................. 474/111, 140
See application file for complete search history.

(56) References Cited

U.S. PATENT DOCUMENTS

| | | | | |
|---|---|---|---|---|
| 4,826,468 A | * | 5/1989 | Friedrichs | 474/101 |
| 4,832,664 A | * | 5/1989 | Groger et al. | 474/111 |
| 5,045,032 A | * | 9/1991 | Suzuki et al. | 474/140 |
| 5,222,917 A | * | 6/1993 | Shimaya et al. | 474/101 |
| 5,318,482 A | * | 6/1994 | Sato et al. | 474/111 |
| 5,813,935 A | * | 9/1998 | Dembosky et al. | 474/111 |
| 5,820,502 A | * | 10/1998 | Schulze | 474/140 |
| 5,853,341 A | * | 12/1998 | Wigsten | 474/140 |
| 5,984,815 A | * | 11/1999 | Baddaria | 474/111 |
| 6,013,000 A | * | 1/2000 | Moretz | 474/111 |
| 6,036,613 A | * | 3/2000 | Diehm | 474/111 |
| 6,302,816 B1 | * | 10/2001 | Wigsten | 474/111 |
| 6,601,473 B2 | * | 8/2003 | Suzuki | 74/579 R |
| 6,612,952 B1 | * | 9/2003 | Simpson et al. | 474/111 |
| 6,645,102 B2 | * | 11/2003 | Kumakura | 474/111 |
| 6,843,742 B2 | * | 1/2005 | Konno | 474/111 |
| 6,852,051 B2 | * | 2/2005 | Konno | 474/111 |
| 6,889,642 B2 | * | 5/2005 | Fink et al. | 123/90.31 |
| 6,902,505 B2 | * | 6/2005 | Yonezawa et al. | 474/111 |
| 6,939,259 B2 | * | 9/2005 | Thomas et al. | 474/111 |

(Continued)

FOREIGN PATENT DOCUMENTS

JP 2004150615 5/2004

OTHER PUBLICATIONS

Unpublished U.S. Appl. No. 13/597,383 Transmission Guide.
Unpublished U.S. Appl. No. 13/600,994 Transmission Guide.

*Primary Examiner* — Henry Liu
(74) *Attorney, Agent, or Firm* — Howson & Howson LLP

(57) ABSTRACT

The synthetic resin guide in accordance with the invention comprises an elongated synthetic resin shoe having a front surface for sliding contact with the transmission medium and a back surface opposite from the front surface and a plurality of engaging members disposed in longitudinally spaced relationship to one another. The guide also comprises an elongated synthetic resin base in contact with the back surface of the shoe and supporting the shoe, the base having a plurality of longitudinally spaced engaged portions each of which engages with one of the engaging members. One engaging member is fixed to the engaged portion with which it is engaged. The other engaging members are longitudinally movable relative to the engaged portions with which they are engaged. Thus, the guide allows longitudinal thermal expansion and contraction of the shoe relative to the base.

12 Claims, 11 Drawing Sheets

(56) References Cited

U.S. PATENT DOCUMENTS

| | | | |
|---|---|---|---|
| 6,955,621 B2 * | 10/2005 | Wigsten et al. | 474/110 |
| 6,969,331 B2 * | 11/2005 | Konno | 474/111 |
| 7,018,312 B2 * | 3/2006 | Sonobata | 474/111 |
| 7,476,169 B2 * | 1/2009 | Konno | 474/140 |
| 7,513,843 B2 * | 4/2009 | Markley et al. | 474/111 |
| 7,524,254 B2 * | 4/2009 | Konno | 474/111 |
| 7,691,018 B2 * | 4/2010 | Haesloop et al. | 474/111 |
| 7,951,029 B2 * | 5/2011 | Oota et al. | 474/111 |
| 7,967,708 B2 * | 6/2011 | Hayami et al. | 474/111 |
| 8,007,385 B2 * | 8/2011 | Hirayama et al. | 474/111 |
| 2006/0172835 A1 * | 8/2006 | Konno | 474/111 |
| 2009/0105023 A1 * | 4/2009 | Oota et al. | 474/111 |

* cited by examiner

TRANSMISSION GUIDE

CROSS REFERENCE TO RELATED APPLICATIONS

This application claims priority on the basis of Japanese patent application No. 2011-169480, filed on Aug. 2, 2011. The disclosure of Japanese patent application No. 2011-169480 is hereby incorporated by reference.

FIELD OF THE INVENTION

The invention relates to a synthetic resin guide for an endless, traveling, flexible, power transmission medium, such as a roller chain or a silent chain used to transmit rotation from a driving sprocket to one or more driven sprockets in the transmission.

BACKGROUND OF THE INVENTION

In a timing transmission, the transmission medium, typically a chain, is in sliding engagement with a pivoted guide, which serves as a tensioner lever in cooperation with a tensioner, on the slack side of the transmission, and in sliding engagement with a fixed guide on the tension side of the transmission. The guide body is typically made of a primary resin and a sliding-contact portion is made of secondary resin. The sliding-contact portion is fused with and integrated into a supporting portion of the guide body and configured to slidably contact a chain. Japanese laid-open Patent Application No. 2004-150615, discloses a guide formed by two-color molding, wherein the strength of the fusion of the interface between the guide body and the sliding-contact portion is enhanced.

U.S. Pat. No. 7,524,254, granted Apr. 28, 2009, describes another transmission guide in which plural L-shaped engagement pieces engage with the sides of the guide base. Strips protruding from the sides of the guide base engage with cut-away portions of the shoe. The L-shaped protrusions and strips are staggered along the length of the guide in a zigzag formation along the two sides of the guide. This arrangement provides for easier assembly of the guide, prevents the shoe from falling out by engagement of the shoe and the base, and keeps the chain stable without causing detachment of the shoe.

Because automobiles are driven in various climates of the world, chain guides are exposed to a range of temperatures from below freezing to high temperatures such as those in desert regions. The chain guide is also exposed to engine oil at a high temperature. The transmission chain also generates frictional heat as it slides on the sliding-contact portion of the guide. Thus, the chain guide is used under varying temperatures from below freezing to exceeding 100° C., so that a glass fiber reinforced resin composing the guide body and the non-reinforced resin composing the sliding-contact portion expand and contract when the engine is operating, in a manner similar to the manner in which metal components expand and contract with changes in temperature. The degree of expansion and contraction of the non-reinforced resin is greater than the degree of expansion and contraction of a glass fiber-reinforced resin. As a result, when the engine is operated at low temperatures, the sliding-contact portion contracts more than the guide body and is destroyed sooner. Furthermore, when the engine is operated at high temperatures, the sliding-contact portion can detach from, or falls out of, the guide body because the sliding-contact portion expands more than the guide body.

In the prior art guide described in U.S. Pat. No. 7,524,254, because the base frame is molded of glass fiber-reinforced resin and the shoe composed of the non-reinforced resin, the guide must be assembled by engaging, while twisting, the hook portions and the projecting strips provided in the shoe with the cutaway portions provided in the base frame. The guide is also provided with a predetermined gap between the cutaway portion of the base frame and the hook portion of the shoe so that the shoe freely moves in the longitudinal direction to absorb the thermal expansion and contraction of the shoe.

As a result, when the transmission chain vibrates due to fluctuation of load on the engine, the shoe moves back and forth in the longitudinal direction within the gap and the hook portion of the shoe collides with the cutaway portion of the base frame, generating noise. Further, if the back and forth movement increases, the part where the hook portion of the shoe collides against the cutaway portion of the base frame wears, the hook portion can be broken, and the contact surface of the base frame and the shoe can become worn and damaged.

SUMMARY OF THE INVENTION

The transmission guide of the invention solves the above problems by providing a guide that does not require assembly of the synthetic resin shoe with the base, prevents wear of the shoe, prevents falling out or detachment of the shoe from the base due to thermal expansion and contraction, and vibratory noise.

In one aspect, the synthetic resin guide in accordance with the invention comprises an elongated synthetic resin shoe having a front surface for sliding contact with the transmission medium and a back surface opposite from the front surface. The shoe has a plurality of engaging members disposed in longitudinally spaced relationship to one another. The shoe also has a chain entry end and a chain exit end.

The guide also comprises an elongated synthetic resin base in contact with the back surface of the shoe and supporting the shoe. The base has a plurality of longitudinally spaced engaged portions. Each of the engaged portions is engaged by one of the engaging members.

One engaging member is fixed to the engaged portion with which it is engaged. The other engaging members are longitudinally movable relative to the engaged portions with which they are engaged. Thus, the guide allows longitudinal thermal expansion and contraction of the shoe relative to the base.

The configuration of the engaging members and engaged portions provides several advantages. The guide is subject to thermal expansion and contraction due to differences in ambient and engine operating temperature. The shoe and base sometimes experience differences in the rate and/or magnitude of thermal expansion or contraction. Because one of the engaging members is fixed to the engaged portion, the shoe and the base are prevented from detaching from each other. However, differences in thermal expansion and contraction are accommodated because the guide allows for movement of the remaining engaging members forward and backward along the direction of elongation of the guide, while staying integrated. Thus, detachment and internal strain between the shoe and the base is prevented along with wear and damage caused by the same.

The guide can take any configuration with regard to the engaged portion and engaging members so long as one engaging member remains fixed in the corresponding engaged portion. Preferably the engaging member nearest one or the other of the ends of the shoe is the fixed member, and in an embodiment to be described, the fixed engaging member is the engaging member nearest the chain entry end of the shoe.

The engaging members and engaged portions can take various shapes depending on the advantages required. In each configuration, the invention prevents the shoe from detaching from the supporting surface of the base and allows for a stable sliding surface for the transmission chain.

In one embodiment, the engaging members and engaged portions are rectangular in shape. The engaging members are in contact with two sides of the engaged portion at all times, providing maximum stability while still allowing movement in the longitudinal direction. This helps prevent vibration and noise generated between the engaging members and engaged portions.

In another embodiment, the engaging members and engaged portions are trapezoidal in shape, being tapered toward the chain entry end. In this configuration, relative movement in the direction of the taper is limited.

According to a third aspect of the invention, because the engagement hole of the base and the engaging projection piece of the shoe have a wedge-like or trapezoidal engagement surface tapered toward the chain entry end, even if the shoe and the base move relative to each other due to thermal expansion and contraction, the engagement holes of the base and the engaging projections of the shoe always remain in close contact, restraining thermal expansion and contraction to the longitudinal direction of the guide. Therefore, it is possible to prevent the shoe from detaching from a supporting surface of the base and to assure a stable sliding surface for the transmission chain. It is also possible to prevent vibratory noises that would otherwise be caused by repeated contact between the engagement holes of the base and the engaging projections of the shoe due to variations in load peculiar to the engine.

In yet another embodiment, the engaged portions are trapezoidal in shape tapered toward the chain entry end and the engaging members are cylindrical pins. In this configuration, the pin contacts the engaged portion only at tangential points on the two sides. Thus, the engaging members are able to move quickly in the engaged portion, having little sliding resistance. In yet another embodiment, engaging members are L-shaped. The L-shaped engaging members (engaging hooks) and corresponding engaged portions may also take different shapes. In one embodiment, the L-shaped engaging member and engaged portion are rectangular in shape. In another embodiment, the L-shaped engaging member and engaged portion are trapezoidal in shape tapered toward the chain entry end. In these embodiments, the L-shaped engaging member engages with the back of the base, allowing for longitudinal movement to account for differences in thermal expansion and contraction, while still preventing the shoe from detaching from the base.

According to the sixth aspect of the invention, because the cutaway portion of the base and the engaging hook of the shoe have a wedge-like or trapezoidal engagement surface tapered toward the chain entry end, even if the shoe and the base move relative to each other due to thermal expansion and contraction, the cutaway portion of the base and the engaging hook of the shoe remain in a close contact and restrain thermal expansion and contraction to the longitudinal direction of the guide. Therefore, it is possible to prevent the shoe from detaching from the supporting surface of the base and to assure a stable sliding surface for the transmission chain.

The engaging members and engaged portions may be disposed on one or both sides of the shoe and base.

In yet another embodiment, the shoe has a hook on the chain entry end which curves under and toward the chain exit end and engages with the base. The hook is molded and integrated with the shoe and securely engages the base. This enhances the strength of the guide. Thus, even if a tensile force is generated by the chain when the transmission load of the engine is great or when there is insufficient lubrication, the load required to fix and maintain the chain is dispersed.

DETAILED DESCRIPTION OF THE PREFERRED EMBODIMENTS

Figure 1:
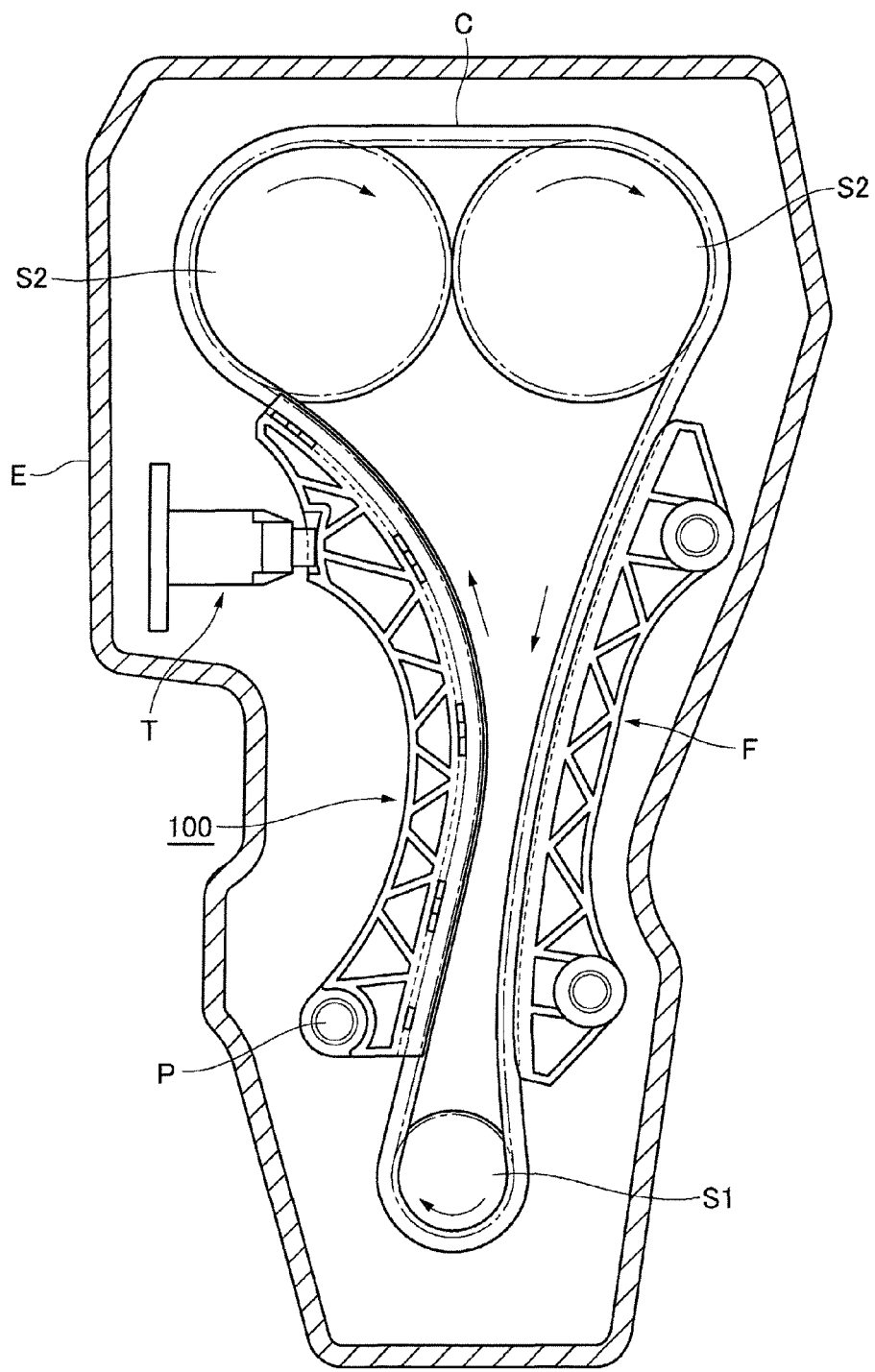
FIG. 1 is a schematic elevational view of an engine timing transmission incorporating a synthetic resin guide in accordance with the invention.

A pivotable resin guide 100, in accordance with the invention is shown in FIG. 1. One end of the guide is pivotally attached to an engine block E of an automobile engine by means of a shoulder bolt P. The guide applies tension to a traveling timing chain C that is in mesh with teeth of a crankshaft sprocket S1 and teeth of a pair of camshaft sprockets S2.

A tensioner T shown in FIG. 1 applies a force to the transmission guide 100 to prevent transmission problems caused by excessive or insufficient tension, and a stationary guide F is fixed to the engine block E to guide the timing chain.

Figure 2:
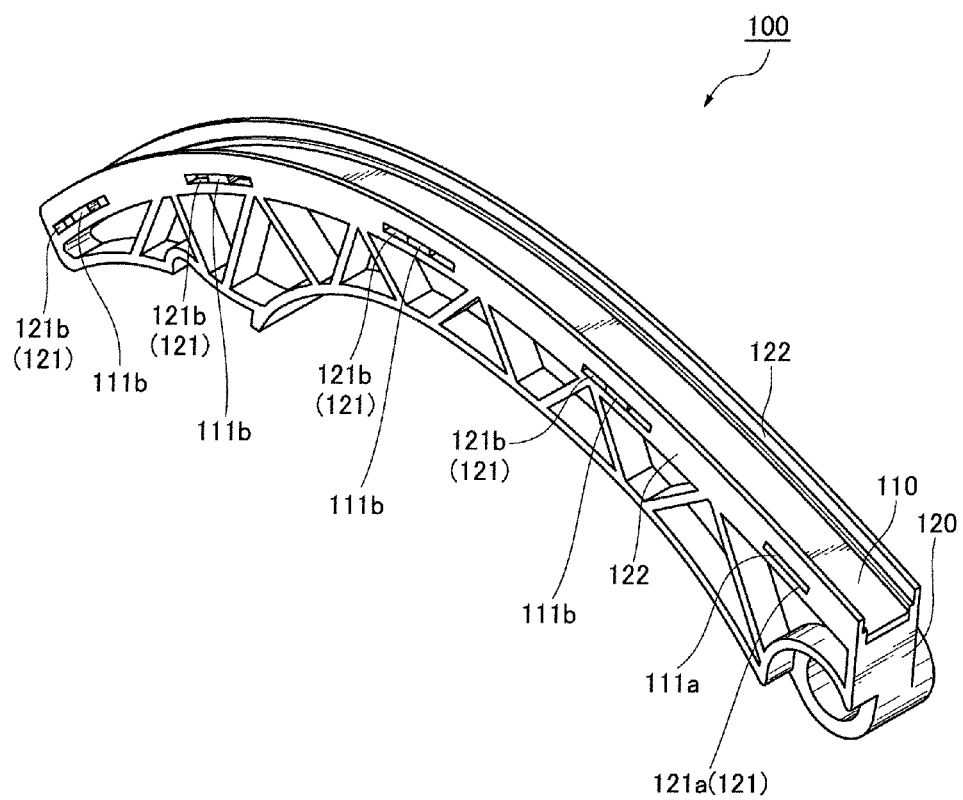
FIG. 2 is a perspective view of the transmission guide shown in FIG. 1.
Figure 3:
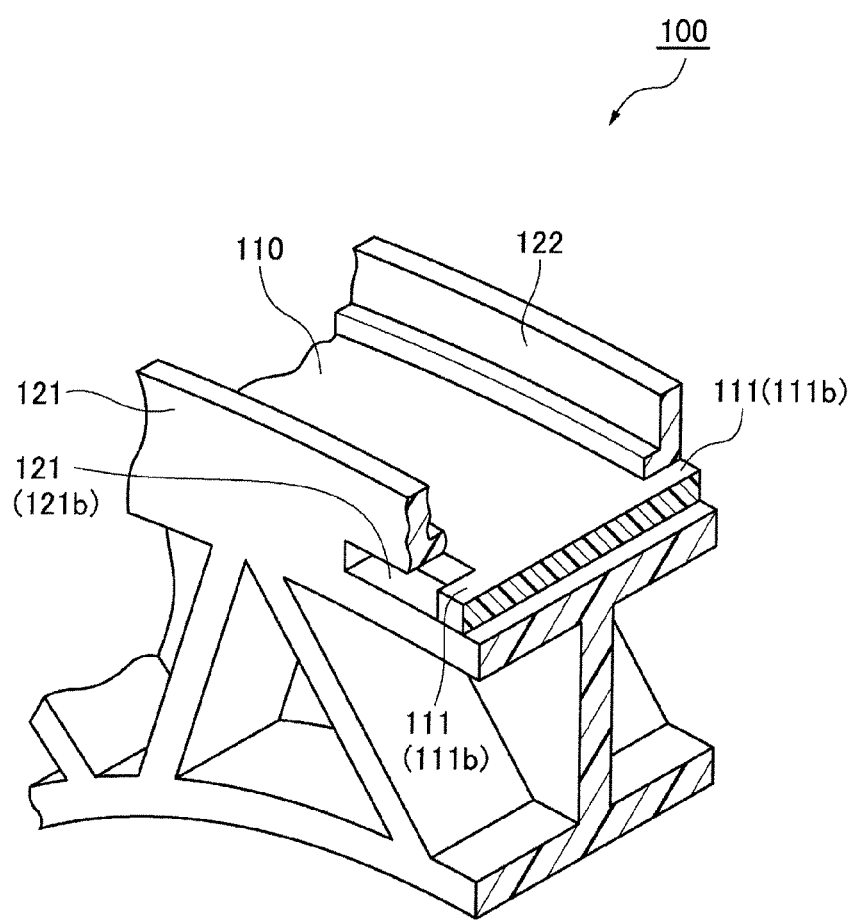
FIG. 3 is a cross-section view of the transmission guide shown in FIG. 2.
Figure 4A:
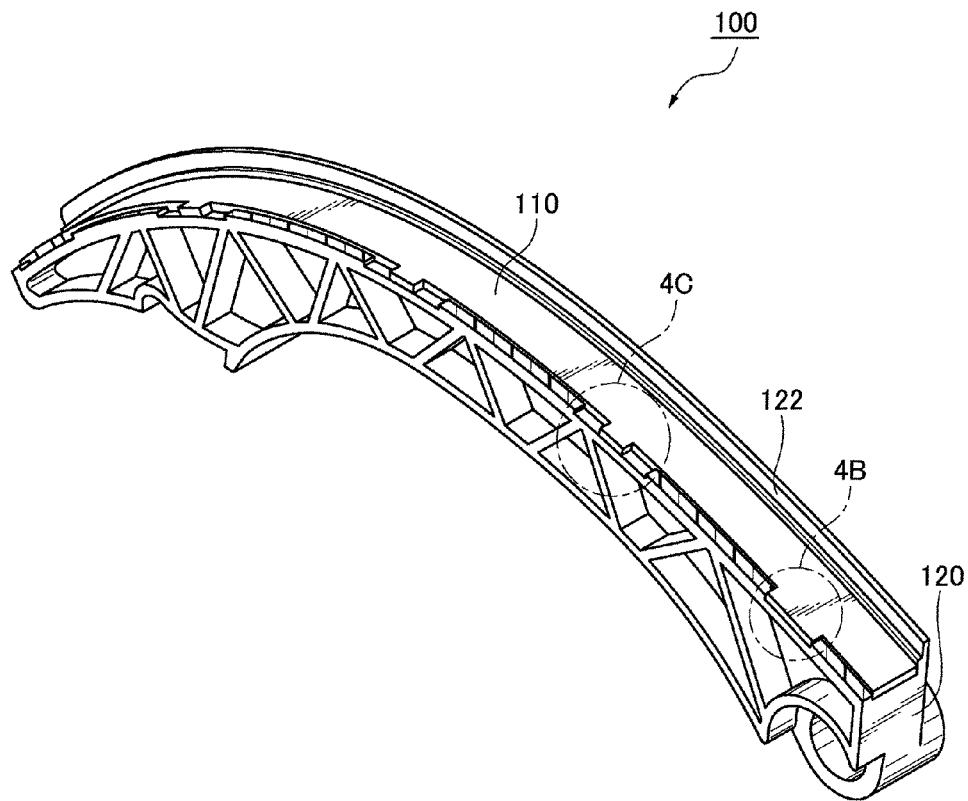
FIG. 4A is a perspective view illustrating the transmission guide in FIG. 2 partially cut away.
Figure 4C:
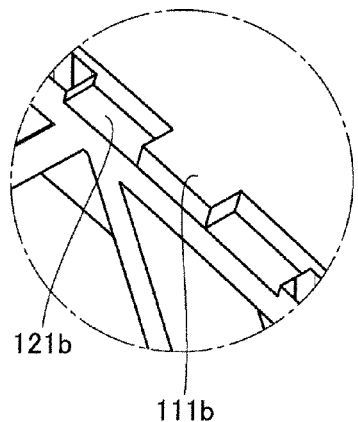
FIG. 4C is an enlarged view of another part of the transmission guide in FIG. 4A showing an engaging member in the engaged portion.
Figure 4B:
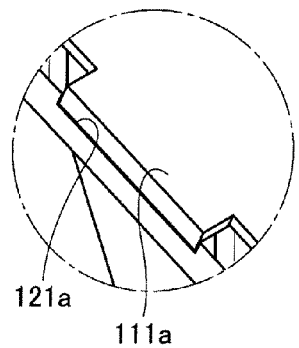
FIG. 4B is an enlarged view of a part of the transmission guide in FIG. 4A showing the engaging member closest the chain entry end of the shoe in the engaged portion.

As shown in FIGS. 2 through 4, the pivotable guide 100 is preferably a two part structure comprising an integrally molded, synthetic resin shoe 110 and a synthetic resin base 120. The shoe 120 has a sliding-contact portion for allowing travel of the transmission chain C along the longitudinal direction. The shoe is preferably made of polyamide resin and the base is molded of reinforced polyamide resin containing glass fibers for supporting the back of the shoe 110 along the longitudinal direction.

The guide may be molded as two separate pieces and assembled. In a preferred alternative, the guide may be formed as a unit using the two-part molding process also referred to as 2-Shot molding, Bi-injection molding, Co-injection Molding, or Multi-Shot Injection Molding, as described further below. In this embodiment, the synthetic resin shoe 110 and the synthetic resin base 120 are integrated during molding of the movable guide 100. Thus, no additional work is required to assemble the guide.

The movable guide 100 of the first embodiment has a plurality of engaging members 111 disposed in spaced relationship along the longitudinal direction of the shoe 110. The guide may have two or more such engaging members including 3, 4, 5, 6, 7, 8, 9 or more. The base has a plurality of engaged portions 121 disposed in the direction of elongation of the base 120 to match the number of engaging members in the shoe. For simplicity, reference will be made to the example shown in FIG. 2. However, a larger or smaller number of engaging members and corresponding engaged portions can be used. In the embodiment shown in FIG. 2, there are 5 engaging members. One engaging member 111a nearest the chain entry end faces and is fused and fixed to one of the engaged portions 121a in the base. The remaining four engaging members 111b are disposed in the guide longitudinal direction of the shoe 110 so as to face and engage respectively with the remaining four engaged portions 121b. The four engaging members 111b are smaller than the engaged portions in the longitudinal direction and thus, are movable within the engaged portions 121b to compensate for changes of length of the shoe caused by thermal expansion and contraction.

The base has a pair of parallel side wall ribs 122 which extend in the direction of elongation of the shoe 110. In one embodiment, the engaged portions 121 are holes that cut through the side wall ribs 122 and extend in the direction of elongation. The ribs 122 sandwich and restrict the shoe 110 in the longitudinal direction. The engaging members 111 of the shoe 110 project in the guide width direction of the shoe 110 and engage with the engaged portions 121 of the base 120.

As shown in FIGS. 5A through 5D, with this arrangement, even under varying temperatures, it is possible to compensate for the difference in thermal expansion and contraction of the shoe and the base by allowing the engaging means 111b to move in the longitudinal direction while staying engaged and integrated with the engaged portions 121b of the base 120 while, the engaging means 111a closest to the chain entry end remains fixed in the engaged portion 121a.

Figure 5A:
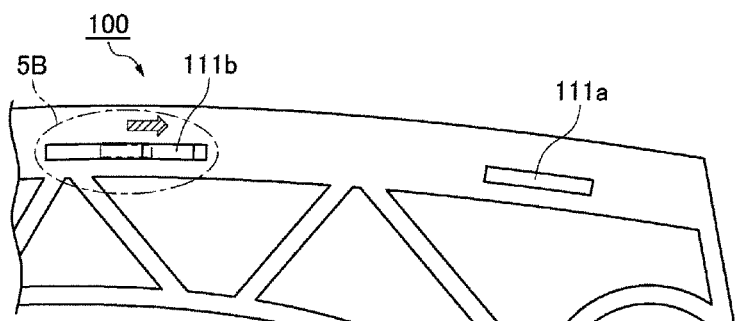
FIG. 5A is a side view illustrating one example of thermal deformation of the transmission guide shown in FIG. 2.
Figure 5B:
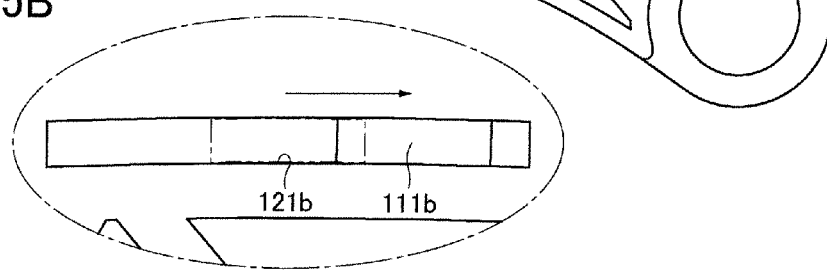
FIG. 5B is an enlarged view of a part of the transmission guide in FIG. 5A showing movement of the engaging member in the engaged portion.
Figure 5C:
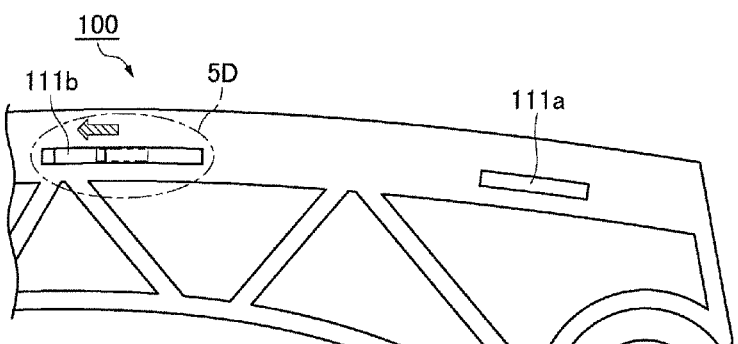
FIG. 5C is a diagram illustrating another example of the thermal deformation of the transmission guide shown in FIG. 2.
Figure 5D:
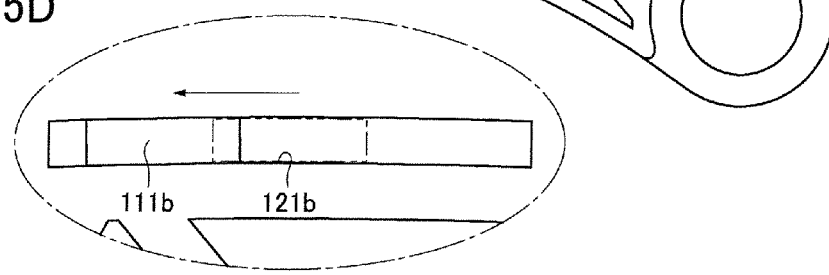
FIG. 5D is an enlarged view of a part of the transmission guide in FIG. 5C showing movement of the engaging member in the engaged portion.

FIGS. 5A and 5B show the relative movement of the engaging means 111b of the shoe 110 within the engaged portion 121b of the base 120 when the shoe 110 contracts thermally more than the base 120. FIGS. 5C and 5D show the relative movement of the engaging means 111b of the shoe 110 within the engaged portion 121b when the shoe 110 expands thermally more than the base 120.

Figure 6A:
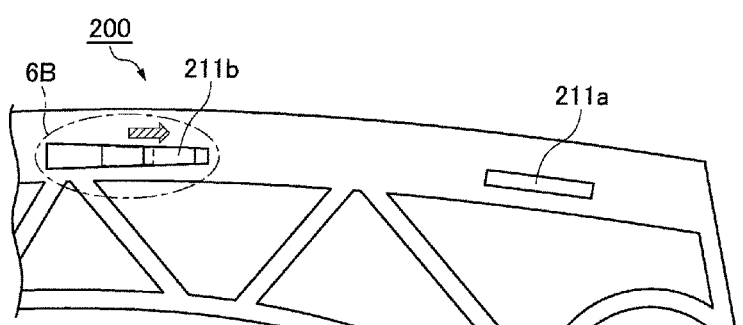
FIG. 6A is a diagram illustrating one example of thermal deformation in a modified example of the transmission guide shown in FIG. 2.
Figure 6B:
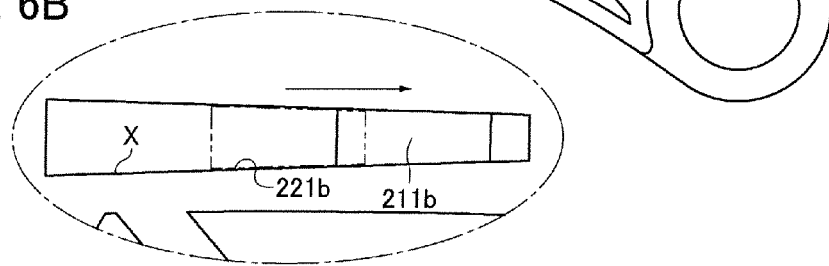
FIG. 6B is an enlarged view of a part of the transmission guide in FIG. 6A showing movement of the engaging member in the engaged portion.
Figure 6C:
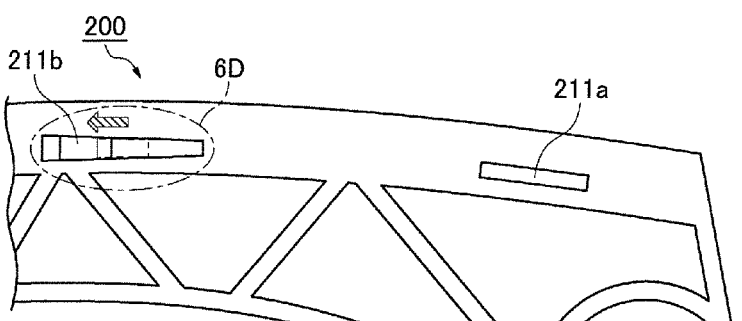
FIG. 6C is a diagram illustrating another example of the thermal deformation in the modified example of the transmission guide shown in FIG. 2.
Figure 6D:
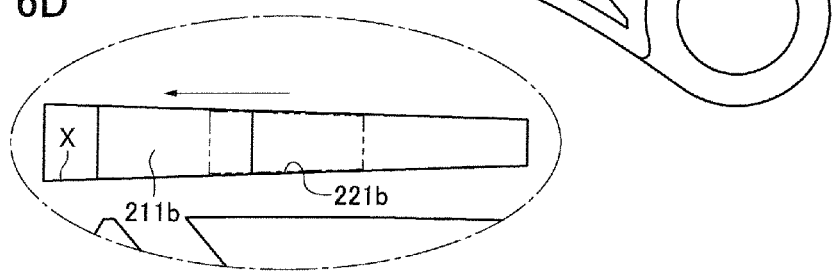
FIG. 6D is an enlarged view of a part of the transmission guide in FIG. 6C showing movement of the engaging member in the engaged portion.

The engaging means and/or the engaged portions can be of different shapes. FIGS. 6A through 6D show an alternate embodiment for the engagement means and corresponding engaged portions. FIGS. 6A and 6B show the relative movement of the engaging means 211b within the engaged portion 221b of the shoe 210 when the shoe 210 contracts thermally more than the base 220. FIGS. 6C and 6D show the relative movement of the engaging means 211b of the shoe within the engaged portion 221b when the shoe expands thermally more than the base. In this embodiment, the engaging means and engaged portion have a tapered shape. That is, a cross section of the engagement means, taken along a plane cut in the direction of elongation of the shoe, provides a trapezoidal shape, tapered at the chain entry end. The shape of the engaged portion corresponds to the shape of the engaging means. Thus, the engagement hole 221b of the base 220 and the engaging projection 211b of the shoe 210 have a wedge-like engagement surface X tapered toward the chain entry end.

Figure 7A:
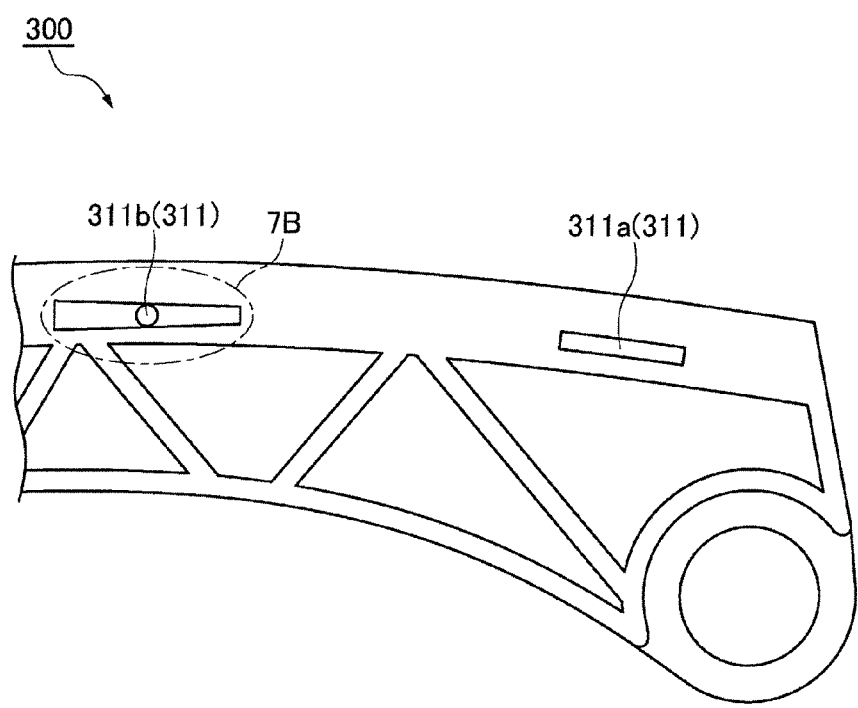
FIG. 7A is a diagram illustrating thermal deformation in another modified example of the transmission guide shown in FIG. 2.
Figure 7B:
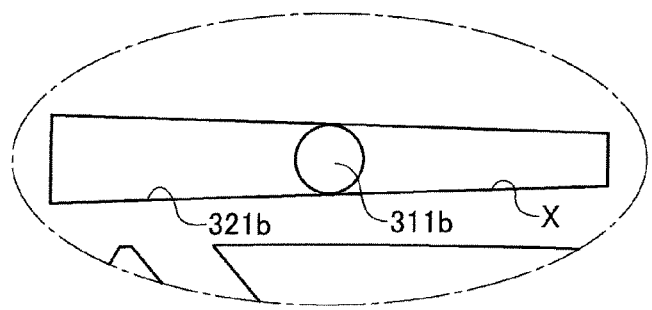
FIG. 7B is an enlarged view of a part of the transmission guide in FIG. 7A showing movement of the engaging member in the engaged portion.

FIGS. 7A and 7B show another alternate embodiment for the engaging means and corresponding engaged portion. FIGS. 7A and 7B show the relative movement of the engaging means 311b within the engaged portion 321b of the shoe when the shoe expands/contracts thermally more than the base. In this embodiment, the engaged portion 321b has a trapezoidal or wedge-like engagement surface X which is tapered toward the chain entry end as described above. The engaging means 310 is a pin shape, with a circumferential surface, that tangentially contacts the engaged portion 321b in the guide width direction.

Figure 8A:
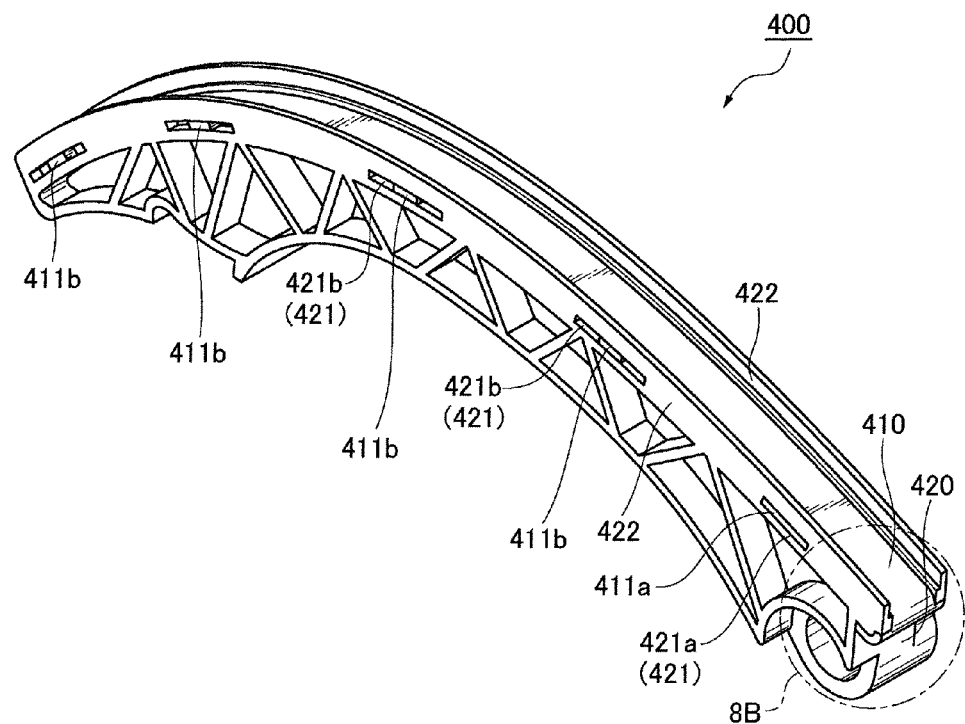
FIG. 8A is a perspective view of another embodiment of the transmission guide shown in FIG. 2 having the hook on the chain entry end.
Figure 8B:
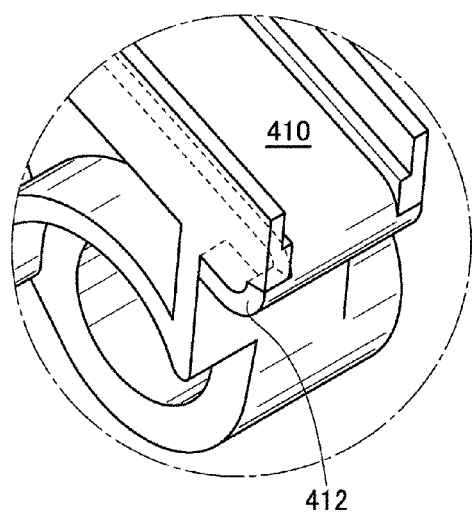
FIG. 8B is an enlarged view of a chain entry end of the transmission guide shown in FIG. 8A showing the hook.

FIG. 8A shows an embodiment in which a hook 412 is attached to the chain entry end which curves under and toward the chain exit end and engages with the base 422. The hook 412 is molded and integrated to the chain entry-side of the base 420. The hook provides additional stability for the guide. Thus, when a tensile force is generated on the chain exit side due to sliding resistance of the chain when the transmission load is great or when lubrication of engine oil is insufficient, the load is still able to be dispersed, and stability of the guide maintained.

Figure 9:
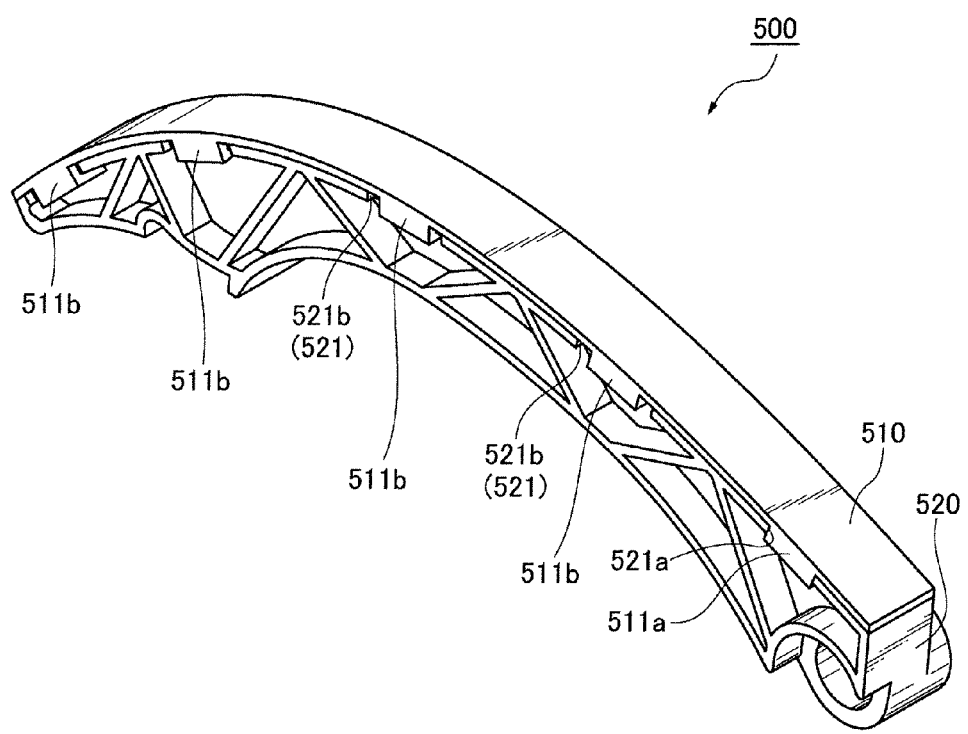
FIG. 9 is a perspective view of the transmission guide of another embodiment of the invention.
Figure 10:
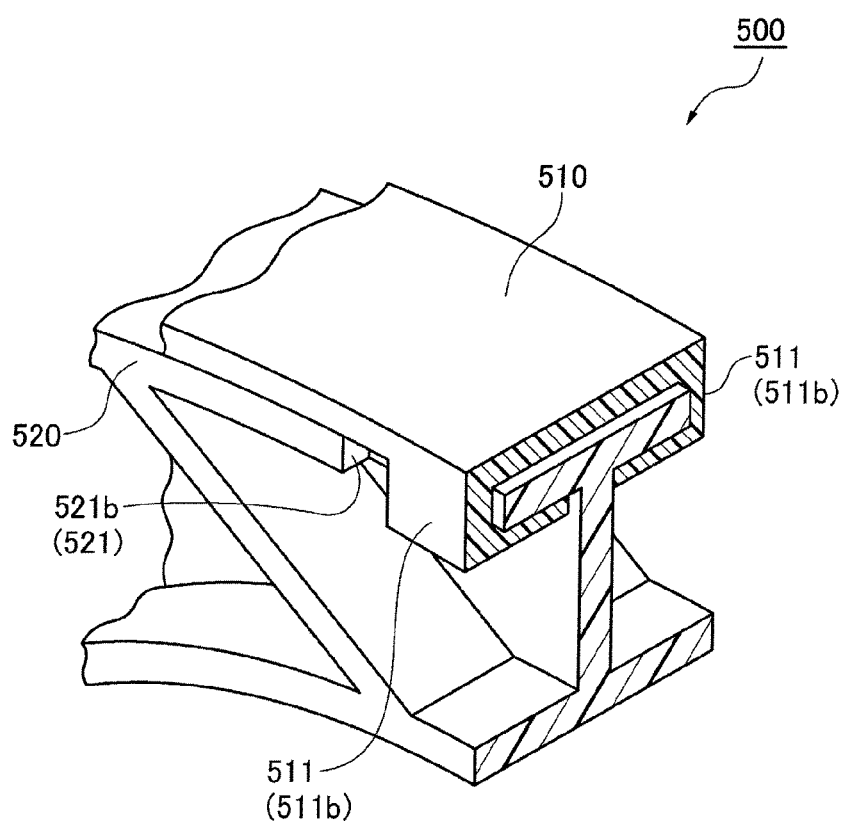
FIG. 10 is a cross-section view of the transmission guide shown in FIG. 9.

FIG. 9 shows an alternate embodiment in which the engaging member 511 is L-shaped. The engaged portion 521b of the synthetic resin base 520 is composed of a cutaway portion formed by cutting away the base 520 in the longitudinal direction. The L-shaped engaging member 521b engages with the shoe 510 in the longitudinal direction and projects to the back side of the shoe 510 to hold and engage with the base 520 through the cutaway portion 521b. With this arrangement, the cutaway portion 521b that composes the engaged portion of the base 520 is formed at a position to avoid the sliding surface of the transmission chain C. The L-shaped engaging member 611b engages with the engaging portion 621b and projects in the guide width direction on the back side of the base in the guide width direction. This provides additional support and restriction of movement, while still allowing for temperature fluctuations and preventing detachment of the shoe from the base.

Figure 11A:
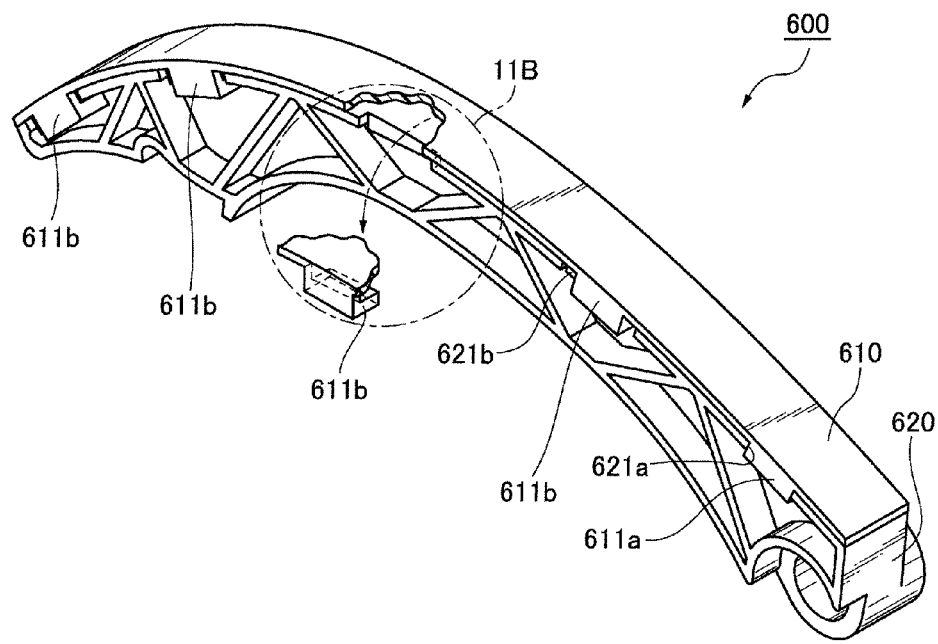
FIG. 11A is a diagram illustrating thermal deformation in a modified example of the transmission guide shown in FIG. 9.
Figure 11B:
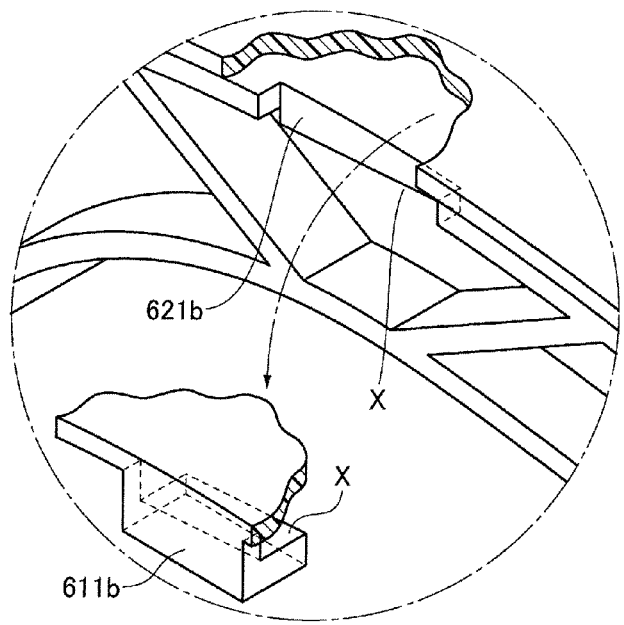
FIG. 11B is an enlarged view of a part the transmission guide shown in FIG. 11A.

FIG. 11 shows an alternative embodiment in which the engaged portion (cutaway portion) 621*b* of the base 620 and the L-shaped engaging member 611*b* of the shoe 610 have a wedge-like engagement surface X tapered toward the chain entry end. Here, the engaged portion 621*b* is received in the engaging member 611*b*, and consequently, the fit of the engaging portion with the engaged portion becomes tighter as the shoe expands and its engaging members move toward the chain exit end.

With this arrangement, even if the shoe 610 and the base 620 move relatively due to the thermal expansion and contraction, the cutaway portion 621*b* of the base 620 and the engaging member 611*b* of the shoe 610 always move relative to each other in close contact, and restrain thermal expansion and contraction to the longitudinal direction of the guide. Therefore, the movable guide 600, which is a modified example of the movable guide 500, makes it possible to prevent the synthetic resin shoe 610 from detaching from the supporting surface of the synthetic resin base 620, and assures a stable sliding surface for the transmission chain C.

Although reference is made above to the pivotable guide 100 shown in FIG. 1, the features the invention may also be utilized in a fixed guide. Thus, for each embodiment described above with reference to a pivotable guide, there can be a corresponding embodiment in a fixed guide.

The guide may be produced by any conventional manufacturing means known to one of skill in the art. This includes two-member molding, two-color molding, multishot molding or sandwich molding. This process is well known in the art. In general, in this process, the resin base 120 is molded within a die by primary injection molding. The configuration of the die is then changed and the shoe 110 is molded within the same die by implementing secondary injection molding. In the alternate, the shoe may be molded by primary injection molding within the die, with secondary injection molding used within the same die to mold the base.

The specific material of the synthetic resin used for the transmission guide of the invention may be any synthetic resin known in the art such as polyamide or polybutylene terephthalate resins. In one embodiment, the shoe, having the surface for sliding of the chain is composed of a polyamide resin such as polyamide 6 resin, polyamide 66 resin, polyamide 46 resin or fully aromatic resin. In another embodiment, the base that supports the back of the shoe is composed of reinforced polyamide resin containing glass fibers that exhibits guide strength and wear resistance.

What is claimed is:

1. A guide for an endless, flexible, traveling transmission medium, the guide comprising:
   an elongated synthetic resin shoe having a front surface for sliding contact with the transmission medium, a back surface opposite from said front surface, and a plurality of engaging members disposed in longitudinally spaced relationship to one another, said shoe having a chain entry end and a chain exit end; and
   an elongated synthetic resin base in contact with the back surface of the shoe and supporting the shoe, said base having a plurality of longitudinally spaced engaged portions, each of the engaged portions being engaged by one of the engaging members;
   wherein one of said engaging members is immovable relative to the engaged portion with which it is engaged, and the others of said engaging members are longitudinally movable relative to the engaged portions with which they are engaged;
   whereby the guide allows longitudinal thermal expansion and contraction of the shoe relative to the base.

2. The guide of claim 1, wherein a first one of said plurality of longitudinally spaced engaging members is the one of said engaging members that is nearest said chain entry end of the shoe, and a second one of said engaging members is the one of said engaging members that is nearest the chain exit end of the shoe, and wherein one of said first and second engaging member is immovable relative to the engaged portion with which it is engaged.

3. The guide according to claim 1, wherein the fixed engaging member is the engaging member nearest said chain entry end of the shoe.

4. The transmission guide according to claim 1, wherein the engaging members and engaged portions are rectangular in shape.

5. The transmission guide according to claim 1, wherein the engaging members and engaged portions are trapezoidal in shape and tapered toward the chain entry end.

6. The transmission guide according to claim 1, wherein the engaged portions are trapezoidal in shape and tapered toward the chain entry end, and the engaging members are cylindrical pins.

7. The transmission guide according to claim 1, wherein the engaging members are L-shaped.

8. The transmission guide according to claim 1, wherein said guide has first and second sides spaced from each other in a lateral direction parallel to said front surface of the shoe, and wherein plural engaging members and engaged portions are disposed on said first side of the guide and plural engaging members and engaged portions are disposed on said second side of the guide.

9. The transmission guide according to claim 1, wherein the shoe has a hook on the chain entry end curving under and toward the chain exit end and engaging with the base.

10. The transmission guide according to claim 1, wherein said one of said engaging members is fused to the engaged portion with which said one of said engaged members is engaged.

11. The transmission guide according to claim 1, wherein said others of said engaging members are longitudinally movable, in both of two opposite longitudinal directions, relative to the engaged portions with which they are engaged.

12. The transmission guide according to claim 1, wherein said one of said engaging members is fused to the engaged portion with which said one of said engaged members is engaged, and wherein said others of said engaging members are longitudinally movable, in both of two opposite longitudinal directions, relative to the engaged portions with which they are engaged.

\* \* \* \* \*